(12) United States Patent
Horley et al.

(10) Patent No.: US 6,384,132 B1
(45) Date of Patent: May 7, 2002

(54) ENVIRONMENTALLY FRIENDLY AQUEOUS ARCHITECTURAL COATING COMPOSITIONS

(75) Inventors: Susan Mary Horley, Buckinghamshire; Stephen Arthur Wheeler, Slough, both of (GB)

(73) Assignee: Imperial Chemical Industries, Plc (GB)

( * ) Notice: Subject to any disclaimer, the term of this patent is extended or adjusted under 35 U.S.C. 154(b) by 0 days.

(21) Appl. No.: 09/286,312

(22) Filed: Apr. 5, 1999

(30) Foreign Application Priority Data

Apr. 8, 1998 (GB) .............................................. 9807426

(51) Int. Cl.⁷ ............................................... C08L 61/04
(52) U.S. Cl. ....................... 524/842; 524/832; 526/200; 526/932
(58) Field of Search ................................ 524/832, 842; 526/200, 932

(56) References Cited

U.S. PATENT DOCUMENTS

| 3,061,472 A | * | 10/1962 | Brockway et al. | ....... 117/139.5 |
| 3,095,391 A | * | 6/1963 | Brockway et al. | ......... 260/17.4 |
| 4,532,295 A | * | 7/1985 | Brabetz et al. | ............. 524/827 |
| 5,003,022 A | | 3/1991 | Nguyen | |
| 5,055,541 A | | 10/1991 | Williams | |
| 5,667,374 A | | 9/1997 | Antti | |

FOREIGN PATENT DOCUMENTS

| EP | 0509202 | | 10/1992 |
| GB | 1 504 876 | * | 3/1978 |
| JP | 57-66197 | * | 4/1982 |
| JP | 62-6996 | * | 1/1987 |
| WO | 9009406 | | 8/1990 |
| WO | 9321244 | | 10/1993 |

* cited by examiner

Primary Examiner—Helen L. Pezzuto
(74) Attorney, Agent, or Firm—Thomas M. Schmitz

(57) ABSTRACT

An environmentally friendly stable aqueous optionally structured water-resistant architectural coating composition (especially a paint) containing a film-forming binder polymer composed of a starch modified by the presence of carboxylic acid or inorganic carboxylate groups and bonded (probably grafted) to chains of copolymerized mono-ethylenically unsaturated monomers (e.g. "acrylic", "vinyl" or "styrenic" copolymers) permitting a stable aqueous dispersion of the binder polymer to be made which retains good water-resistance in the dried paint. The modified starch allows paints to be made with less dependence on materials obtained from non-renewable resources while retaining a low water-sensitivity.

12 Claims, No Drawings

ENVIRONMENTALLY FRIENDLY AQUEOUS ARCHITECTURAL COATING COMPOSITIONS

This invention relates to environmentally friendly (optionally structured) aqueous architectural coating compositions, for example water-resistant paints (or varnishes or woodstains) suitable for use at ambient temperatures (say up to 35° C. and usually above 0 or 5° C.) in decorating surfaces of architectural structures such as buildings or furniture or fittings found in buildings. The invention allows starch to be used commercially in making these aqueous compositions so reducing their dependency on materials obtained from non-renewable resources such as petrochemicals. It also permits the use of smaller amounts of certain expensive co-monomers.

All aqueous architectural paints contain film-forming binder polymer. As a coating of liquid paint dries on a surface, this film-forming binder polymer serves to form a film (i.e. a dried coat) of paint which bonds to the surface and also binds together all the non-volatile components of the paint including particularly any pigments, opacifiers and extenders present.

A wide variety of binder polymers are available, but those most commonly used in aqueous architectural paints are of three broad types obtained from mono-ethylenically unsaturated monomers and known colloquially as the "acrylics", the "vinyls" and the "styrenics". The "acrylics" are usually copolymers of at least two alkyl esters of one or more mono-ethylenically unsaturated carboxylic acids (e.g. methyl methacrylate/butyl acrylate copolymer) whilst the "vinyls" usually comprise copolymers of a mono-vinyl ester of a saturated carboxylic acid and at least one of either an acrylic monomer or a different mono-vinyl ester. The "styrenics" are copolymers containing styrene (or a similar mono-vinyl aromatic monomer) together with a copolymerisable monomer which is usually an acrylic. Such binder polymers require the use of monomers which are obtained from petrochemical feedstocks whereas nowadays it is environmentally desirable to use as much as possible of material obtainable from renewable resources. In addition, some of the monomers essential to the binder polymer contain sterically bulky groups and are therefore relatively expensive.

Starch is one of the most abundant renewable resources because it is commercially available from such crops as potato, wheat, maize (both waxy and non-waxy), rice, sago, sorghum and tapioca. Moreover, it has been known since the 1960's that starch-containing film-forming polymer binders could be made by polymerising mono-ethylenically unsaturated monomers at ambient pressure in the presence of aqueous dispersions of starch whereupon binder polymers were formed which consisted of chains of polymerised mono-ethylenically unsaturated monomers chemically associated with the starch and this reduced the amount of material in the binder which comes from non-renewable resources. The precise nature of the association between the chains of polymerised monomers and the starch has not yet been unequivocally determined, but it is widely believed that the chains graft onto the starch. Such starch-containing binders have been used successfully in adhesives, in coating paper and in sizing textiles but instability problems led to phase separation and unpredictable increases in viscosity which meant that the starch-containing binders were not commercially suitable for use in making aqueous water-resistant architectural paints.

In 1981, British Patent Specification GB 2 075 525A disclosed that long term stability of aqueous dispersions of graft copolymers of starch and "vinyl" monomers could be improved by using a starch which had been modified by a) subjecting it to acid and/or enzymatic hydrolysis either before or after the hydrolysis and b) reacting the starch with molecules which bring about the positive introduction into the starch of (preferably non-ionic or cationic) groups such as carbamylethyl, alkyl, benzyl, benzalkyl, hydroxyalkyl, cyanoalkyl, acyl or dialkylamino alkyl groups.

Very stable aqueous dispersions of starch-containing film-forming binders were then obtained which GB 2 075 525A suggested could be used in adhesives, paper coating, textile sizing and in the making of water-based (i.e. aqueous) paints, although it did not disclose water-resistant architectural paints.

Starch-containing film-forming binders substituted with such specified non-ionic or cationic groups appear to have been very successful in the fields of adhesives, paper coating and textile sizing but they are not well suited for use in making aqueous water-resistant architectural paints owing to a high water-sensitivity as is illustrated by the loss of abrasion resistance which occurs when dried coats of the paints are subjected to the British Standards wet scrub resistance test described later. Water-sensitivity is of course a significant problem when a dried coat of paint is to be exposed to rain or frequent water-condensation.

A secondary disadvantage is that the conventional substituted starch binders are not very effective in creating the structure which is sometimes wanted in aqueous architectural paints, especially thixotropic paints. Structure can be created in various ways including an interaction between a so-called "structuring agent" (which is typically a titanium or zirconium chelate or a structuring clay) and the binder polymer plus any cellulosic thickener which may be present in the paint. Structuring clays are clays such as laponite or bentonite clays. These three types interact in some way which is not fully understood to create a gel. Gel structures reduce the tendency for a paint to drip or splash and so they make painting less messy and allow brushes and rollers to be loaded with greater volumes of paint. During application of the paint to a surface by brush or pad, the paint experiences high shear forces which temporarily destroy the gel structure and allow the paint to be spread easily over the surface. This is known as "thixotropy".

A binder polymer for a modern aqueous architectural paint should preferably be capable of manufacture in conventional plants, nearly all of which operate at ambient pressure and it should be able to form aqueous dispersions which are stable under high shear forces such as are encountered during application of a paint by brush or pad. The paints should be environmentally friendly and able to give dried coatings which are sufficiently water-resistant to permit use outdoors or in humid locations such as found in kitchens and bathrooms. Accordingly, it is an object of this invention to provide an environmentally friendly aqueous coating composition which contains starch which has been modified to permit the formation of stable dispersions of binder polymer but which retains good water-resistance in the dried paint. An optional object is to provide a starch-containing binder polymer which can be used in a thixotropic paint.

Accordingly, this invention provides an environmentally friendly (optionally structured and possibly thixotropic) aqueous architectural coating composition which includes film-forming binder polymer composed of modified starch chemically associated with chains of copolymerised monomers at least 93 wt % (and preferably 95 to 100 wt) of which are selected from mono-ethylenically unsaturated monomers wherein a) the starch has been modified by the introduction of carboxylic acid groups optionally converted to an inorganic salt, b) up to 50 wt % of the starch-containing binder polymer is provided by the modified starch and c) not more than 7 mol % (preferably 0 to 3 mol %) of the copolymerised monomers are derived from carboxylic acid monomers.

Granular amylopectin is the predominant form of starch in most natural sources and for this reason the starch prior to modification generally has a weight average molecular weight of at least $5 \times 10^5$ and usually over $1 \times 10^6$. The preferred starches are obtained from potatoes, maize (corn) or from waxy maize. Potato and maize starch is relatively cheap and contains over 70 wt % amylopectin whereas waxy maize starch is more expensive but contains even more (often over 90 wt %) of amylopectin starch. Waxy potato starch also contains such higher levels of amylopectin but being a genetically modified product, it is not yet authorised for sale to the public.

The native starch is modified by subjecting it to a light oxidation sufficient to convert hydroxyl groups present in the native starch to carboxylic acid groups. The carboxylic acid groups introduced into the starch and also any acid groups which may be present in the copolymer chains may optionally be converted to alkali metal or ammonium salts and in practice the use of ammonium persulphate as a polymerisation initiator will lead to the presence of ammonium salts. Alternatively the adjustment of the pH of the coating composition by means of caustic soda will lead to sodium salts. However, ammonium salts are preferred because they are less harmful to water-resistance.

Light oxidation of the starch also causes a degree of chain scission which likewise introduces carboxylic acid groups likewise optionally converted to their inorganic salts. Light oxidation is simply and cheaply performed using oxygen from for example sodium hypochlorite or hydrogen peroxide. Preferably from 1 to 10 (especially 3 to 7) carboxylic groups per 100 glucose moieties are introduced and it has been found that this confers a long term stability on both the aqueous dispersions of binder and on the liquid paint which stability persists for at least 5 months whilst retaining a good water-resistance in the dried paint.

Carboxylic (i.e. carboxylic acid or salt) modification of the starch has also been found to enable the starch-containing binder polymer to be used in making structured paints. It appears that the introduced carboxylic groups promote some sort of interaction involving chelate or clay structuring agents with the result that when the structuring agents are introduced to the starch-containing binder, a gel structure forms which can confer thixotropy if enough structuring agent is present.

Preferably the starch-containing binder contains less than 30 wt % (most preferably less than 20 wt %) of the modified starch and less than 12 wt % if very low water-sensitivity is wanted.

The starch-containing film-forming binder is preferably made at ambient pressure by dispersing the modified starch in cold water, heating the dispersion to about 70 to 95° C. and then adding conventional free radical initiator such as ammonium persulphate to the aqueous dispersion and feeding in mono-ethylenically unsaturated monomers of the type conventionally used to make film-forming binder polymers for aqueous architectural paints. If preferred, a small amount of monomer and initiator can be added first to produce a seed and then the main charge of monomers and initiator can be added subsequently.

As indicated earlier, examples of suitable mono-ethylenically unsaturated monomers include:

a) "acrylics" such as alkyl (especially methyl, ethyl, ethylhexyl and n-butyl) esters of unsaturated carboxylic acids such as acrylic or methacrylic or fumaric acids or maleic anhydride, b) "vinyls" such as mono-vinyl esters (especially vinyl acetate or vinyl "Versatate"[1]) and

[1]Vinyl "Versatate" is the vinyl ester of so-called "Versatic" acid which is a mixture of aliphatic monocarboxylic acids each containing an average of 9, 10 or 11 carbon atoms and is commercially vailable from the Shell Chemical Company of Carrington, England.

c) "styrenics" which are usually styrene but which can be other monovinylidene aromatics such as vinyl toluene or vinyl pyridine and which are usually copolymerised with comonomers such as the ethyl or ethylhexyl or butyl acrylics mentioned above.

Various mono-ethylenically unsaturated acid or acid anhydride monomers may be copolymerised with the binder monomers to increase the hydrophilic character of the binder polymer in alkaline solutions and so increase the stability of the dispersions. However the acid comonomers must not exceed 7 mol % of the total monomers for otherwise the binder polymer becomes too hydrophilic to retain acceptable water-resistance. Suitable acids include unsaturated carboxylic acids and in particular acrylic or methacrylic acids and unsaturated acid anhydrides include maleic anhydride. If copolymerisation at superatmospheric pressures is commercially tolerable, the hydrophilic nature of the binder polymer can be adjusted downwards by including some mono-olefin (usually some ethylene) in the binder monomers.

It is desirable to choose combinations of monomers which include a sterically bulky monomer so as to result in starch-containing binder polymers in which the chain moieties have a glass transition temperature or "Tg" as calculated using the Fox equation of below 350K and preferably below 325K. A Tg temperature of below 270K may be necessary if it is desired to avoid using organic coalescing solvents. Preferred "acrylic" binder copolymers include copolymers of methyl methacrylate with butyl or 2-ethylhexyl acrylate as sterically bulky monomers and optionally copolymerised with up to 7 mol % acrylic or methacrylic acid. Preferred "vinyl" binder copolymers include copolymers of vinyl acetate with a bulky monomer which is usually vinyl "Versatate" or bulky acrylic monomer as above plus the same optional acid comonomers. Preferred "styrenic" binder copolymers include copolymers of styrene with butyl or 2-ethylhexyl acrylate serving as the bulky monomers with optionally up to 7 mol % acid comonomers as above. Tg will be increased unacceptably by excessive crosslinking and so it is essential not to incorporate more than 7 wt % of a conjugated diene into the binder polymer and it is very much preferred to avoid any such diene. The presence of the free radical initiator at 70 to 90° C. causes polymerisation of the unsaturated monomers to produce chains which are in some way chemically associated with the modified starch. Such association has been found to permit the use of a lower proportion of the sterically bulky monomers (which are relatively expensive) without loss of the ability to apply the paint at ambient temperatures.

Surprisingly, it has been found that the water-resistance of the dried coat of paint can be further increased by adding anionic surfactant to the aqueous dispersion of the modified starch even though surfactants usually cause water-sensitivity.

An aqueous dispersion of the starch-containing film-forming binder is easily converted into a coating composition by stirring it together with all the other components of the composition except for any chelate structuring agent. If a structured composition structured by means of a chelate is wanted, the chelate should be stirred in just before the composition is filled into cans so that the gel structure develops in the can. The most significant of the other components are pigments and opacifiers (usually rutile titanium dioxide or voided organic polymer particles) and also extenders which are solid particles which serve to space apart the pigments and opacifiers. Typical extenders are chalk, limestone, kaolin and talc. Silica may also be present as a matting agent. Whilst this invention is of most importance in making paints, it is also possible to omit the opacifier to produce a varnish or woodstain. The coating compositions preferably have a "Rotothinner" (low shear) viscosity of from 0.15 to 2.0 pascal.sec and a cone and plate (high shear) viscosity of from 0.03 to 0.5 pascal.sec all measured at 25° C. using techniques specified later in this specification. A thixotropic structured composition preferably has a gel strength at 1 week of at least 50 g.cm.

This invention also provides a process for making an environmentally friendly (optionally structured and possibly thixotropic) aqueous paint as described above which includes film-forming binder polymer composed of modified starch chemically associated with chains of copolymerised monomers at least 93 wt % (and preferably 95 to 100 wt %) of which are selected from mono-ethylenically unsaturated monomers wherein the process includes the steps of a) modifying a starch by lightly oxidising it to introduce carboxylic acid groups, optionally converted to an inorganic salt, b) adding free radical initiator to an aqueous dispersion of the modified starch and feeding the unsaturated monomers into the dispersion preferably in the presence of anionic surfactant, c) subjecting the dispersion to a temperature which causes copolymerisation of the monomers to produce chains of copolymerised monomers chemically associated with the modified starch so in turn creating the starch-containing film-forming binder, d) mixing the binder polymer so produced with other components of the composition, e) choosing the ratio of modified starch to unsaturated monomers so as to ensure that the weight of modified starch in the starch-containing binder does not exceed 50 wt % of the weight of the starch-containing binder and f) choosing a ratio of monomers such that not more than 7 mol % (preferably 0 to 3 mol %) of the copolymerised monomers are derived from carboxylic acid monomers.

This process can be successfully performed at ambient pressure provided that the co-monomers do not include monomers such as ethylene or 1, 3-butadiene which are gaseous under ambient pressures at the conventional copolymerisation temperatures.

The invention is further illustrated by the following Examples of which Examples A to C are comparative. In the examples:

Water-resistance was assessed in terms of loss of wet scrub resistance measured as the loss of paint in grams as determined according to British Standard BS 7719 1994 but when performed on dried coats of paint which are only 1 week old.

"Rotothinner" (low shear) viscosity is measured using the Sheen "Rotothinner" which is described in the Sheen Data Sheet on "Rotothinners" available from the address given below. Again measurements are performed at 25° C. "Rotothinner" viscosity corresponds to the viscosity of the paint when being poured from a can or loaded onto a brush.

Cone and Plate (high shear) viscosity is measured according to ASTM Test D 4287-88 at 25° C. Cone and Plate high shear viscosity corresponds to the viscosity of the paint when being applied by brush.

Gel Strength is measured using Sheen Gel Strength Tester supplied by Sheen Instruments Limited of Kingston Surrey England and described in their Data sheet Ref. 414. The measurement is performed at 25° C. using a 4×2 cm paddle.

EXAMPLE 1

Preparation of a Binder and a Paint when the Starch is a Modified Potato Starch a) Preparation of the Binder 64 g of a commercial modified starch which was a proprietary lightly oxidised granular potato starch believed to contain from 1 to 10 carboxylic acid groups per 100 glucose moieties was added via a funnel into 440 g cold (20° C.) water in a reflux flask together with 1.2 g of sodium acetate buffer. The funnel was washed with a further 44 g water which was added to the flask. The flask was heated with stirring to 85° C. for 30 minutes to solubilise the starch.

The contents of the flask were allowed to cool to 67° C. and then 37 g of vinyl acetate monomer mixed with 9 g vinyl "Versatate" monomer were added as binder monomers and the contents were stirred for 10 minutes. Next, 1.2 g of ammonium persulphate initiator dissolved in water were added to the contents which were then heated to 80° C. with stirring over a period of 35 minutes to produce a seed polymer. Then the temperature was raised to 85° C. and 334 g of vinyl acetate, 83 g vinyl "Versatate" and 1.3 g ammonium persulphate in water were added gradually with stirring to the flask over a period of 3 hours. During this time, the major proportion of the vinyl acetate/vinyl "Versatate" film-forming binder copolymer formed and grafted onto the modified starch. The carboxylic acid groups on the starch had been converted to the ammonium salt owing to the presence of ammonium persulphate.

Finally a further 0.54 g of ammonium persulphate in water were added to the flask over a period of 10 minutes with continuing stirring at 85° C., in order to complete the copolymerisation and grafting process. The contents of the flask were then allowed to cool to 70° C. and 1 g t-butyl hydroperoxide in water was added. Further cooling to 60° C. was allowed and 1 g sodium metabisulphite was added followed by cooling to ambient (18° C.) temperature. It was found that a stable aqueous dispersion of oxidised potato starch-containing vinyl acetate/vinyl "Versatate" film-forming binder copolymer containing 10 wt % of the oxidised starch had been produced. The "vinyl" component of the starch-containing binder polymer had a theoretical Glass Transition Temperature (Tg) as determined by the Fox equation of 303° K. and the whole process was performed at ambient pressure.

b) Preparation of a Structured Paint

The binder was converted into a structured architectural paint as follows

A millbase was made up by stirring 69.7 g particulate rutile titanium dioxide, 1.6 g bentonite structuring clay and 15.3 g particulate calcium carbonate extender into 88 g of water containing 1.1 g of polycarboxylate dispersant and 5.3 g benzyl alcohol. Stirring was performed using a high speed stirrer operating at 3 000 rpm for 20 minutes. Stirring was then slowed to 300 rpm. 52 g water and 3.2 g cellulosic thickener were added gradually during a period of five minutes followed by stirring at 3000 rpm for 10 minutes.

Ammonia was added to 230 g of an aqueous dispersion of the binder so as to produce a pH of 8. The millbase was then added gradually to the dispersion of binder copolymer over a period of 30 minutes with stirring at 300 rpm. After addition of the millbase, 30 g "Ropaque" white voided organic pigment were stirred into the mixture followed by 2.5 g of zirconium chelate structuring agent. The mixture was allowed to stand for 15 minutes and then was poured into cans where it developed a gel structure and became an aqueous structured architectural paint. The gel strength of the paint after 1 week and its viscosities were measured and the results are shown in Table 1 together with an assessment of its water sensitivity measured using the scrubbing technique of British Standard 7719:1994.

EXAMPLE 2

And Comparative Examples A to C
The Use of other Starch Types

The procedure of Example 1 was repeated except the oxidised potato starch was replaced in turn by the following alternative starch types:

Example 2 Oxidised waxy maize starch
Comparative Example A Enzyme degraded native potato starch.
Comparative Example B Starch which had been subjected to substitution by hydroxypropyl groups as suggested by GB 2 075 525A.

EXAMPLE 3
The Use of Anionic Surfactant
Preparation of Binder Polymer 55 g of the modified potato starch of Example 1 was added via a funnel to 398 g cold (20° C.) water in a reflux flask together with 1.2 g of sodium acetate and 4.9 g of a proprietory anionic surfactant. The contents of the flask were heated to 85° C. with stirring and 3.1 g of ammonium persulphate in water were added. The temperature was maintained with stirring at 85° C. for 30 minutes during which time mild degradation occurred. Then the temperature was allowed to fall to 65° C.

46 g of the vinyl acetate/vinyl "Versatate" mixture of Example 1 were fed to the contents which were held at 65° C. for 10 minutes. 0.8 g of ammonium persulphate in water were added and the temperature raised to 80° C. with stirring over 35 minutes to produce a seed copolymer similar to that of Example 1 and again the carboxylic acid groups on the starch were converted to the ammonium salt because of the use of ammonium persulphate.

Having produced the seed copolymer, the procedure of Example 1 was then resumed except that 328 g of vinyl acetate, 82 g of vinyl "Versatate" and 4.9 g of the anionic surfactant were added to produce a main bulk of copolymer which was slightly (but not materially) different to that of Example 1. The main bulk of the copolymer comprised 80 wt % vinyl acetate and 20 wt % vinyl "Versatate". It has been found subsequently that the proportion of vinyl "Versatate" can be reduced to 15 wt % with a corresponding increase to 85 wt % vinyl acetate without sufficiently affect-

TABLE 1

PROPERTIES OF PAINTS MADE USING DIFFERENT TYPES OF MODIFIED STARCHES

| Example | Starch Type | Gel Strength Pa · sec | Rotothinner Viscosity (Low Shear) Pa · sec | Cone & Plate (High Shear) Viscosity Pa · sec | BS Water Scrub Resistance mg/cm² | Stability after 5 Months |
|---|---|---|---|---|---|---|
| 1 | Oxidised Potato | 90 | 0.6 | 0.1 | 3.3 | Stable |
| 2 | Oxidised Waxy Maize | 70 | 0.5 | 0.1 | 2.8 | Stable |
| 3 | Oxidised Potato plus anionic surfactant | 130 | 0.5 | 0.1 | 1.6 | Stable |
| A | Enzyme degraded potato | 75 | 0.5 | 0.1 | 3.0 | Flocculated |
| B | Hydroxy propylated Potato | 30 | 0.5 | Unstable | 7.5 | Unstable under high shear |
| C | *Conventional | 150 | 0.6 | 0.1 | 1.9 | Stable |

Gel Strengths and Viscosities measured after 1 week
*The conventional binder was a Vinyl Acetate/20 wt % Vinyl "Versatate" copolymer From Table 1, it can be seen that the hydroxypropylated starch-containing binder polymer could produce a gel strength of only 30 g.cm, showed a high water sensitivity and became unstable under high shear such as is encountered when a paint is brushed onto a surface. The dispersions and paints containing enzyme degraded potato starch were unstable and flocculated after 5 months.

Comparative Example C

An aqueous thixotropic paint was made up according to Part b) of Example 1 except that the starch-containing binder polymer was replaced by a conventional vinyl acetate/vinyl "Versatate" copolymer containing 20 wt % of vinyl "Versatate".

ing the Tg of the binder polymer to hinder application at ambient temperatures.

The starch-containing binder polymer obtained was then used to make a structured paint as in Example 1.

A dried coat of the paint produced was found to be more opaque than that of Example 1 and its water-sensitivity was found to have fallen substantially to give a British Scrub reading of only 1.6 mg/cm² after 1 week.

What is claimed is:

1. An environmentally friendly aqueous architectural coating composition containing a film-forming binder polymer, comprising:
    a modified starch chemically associated with chains of copolymerised ethylenically monomers, where at least 93% by weight of the ethylenically unsaturated monomers are mono-ethylenically unsaturated monomers, and up to 7% by weight of the ethylenically unsaturated monomers are carboxylic acid monomers;

the modified starch being unmodified starch with hydroxyl groups, where the hydroxyl groups have been modified by oxidation to form carboxyl acid groups in the modified starch; and where the modified starch and the copolymerised ethylenically unsaturated monomers are chemically associated by forming an aqueous dispersion of the modified starch and the ethylenically unsaturated monomers, and copolymerising the ethylenically unsaturated monomers to form the film-forming binder polymer of associated copolymerised monomers and modified starch, where the film-forming binder comprises up to 50% by weight of said modified starch.

2. A coating composition according to claim 1 wherein the modified starch contains 1 to 10 carboxylic acid or salt groups per 100 glucose moieties.

3. A coating composition according to claim 1 wherein the modified starch is an oxidised potato or an oxidised maize starch.

4. A coating composition according to claim 1 wherein the composition is structured.

5. A coating composition according to claim 4 wherein the composition is structured by means of a titanium or zirconium chelate or a structuring clay.

6. The coating composition of claim 1 wherein the ethylenically unsaturated monomers comprise 95% to 100% by weight of the mono-ethylenically unsaturated monomers.

7. The coating composition of claim 1 wherein 0 to 3% by weight of the ethylenically unsaturated monomers comprise carboxylic monomers.

8. The coating composition of claim 1 where the carboxyl groups formed on the modified starch are converted to alkali metal salts.

9. The coating composition of claim 1 where the carboxyl groups formed on the modified starch are converted to ammonium salts.

10. The coating composition of claim 1 where the carboxyl groups formed on the modified starch are converted to sodium salts.

11. The coating composition of claim 1 where the film-forming binder polymer comprises by weight less than 30% of the modified starch.

12. The coating composition of claim 1 where the film-forming binder polymer comprises by weight less than 20% of the modified starch.

* * * * *